United States Patent Office 3,480,626
Patented Nov. 25, 1969

3,480,626
CERTAIN AZONIASPIRONORTROPINE DERIVATIVES
Robert Pfleger, Bamberg, Heinz Bertholdt, Lichteneiche, and Wolfram Schulz, Darmstadt, Germany, assignors to Chemische Fabrik Dr. R. Pfleger, Bamberg, Germany
No Drawing. Continuation-in-part of application Ser. No. 348,751, Mar. 2, 1964. This application May 18, 1967, Ser. No. 639,305
Int. Cl. C07d 43/12, 87/36, 51/72
U.S. Cl. 260—247.2
2 Claims

ABSTRACT OF THE DISCLOSURE

The present case relates to a new class of azoniaspiranes of the nor-3α- or 3β-tropanols or esters thereof which in addition to other interesting properties have been found to possess spasmolytic properties surpassing any of the known tropine derivatives and at the same time producing fewer undesirable side effects than previous compounds having such properties. The new derivative may be produced by reacting nortropine, or suitable derivative thereof, with suitable dihalides.

---

This application is a continuation-in-part of Ser. No. 348,751 filed Mar. 2, 1964, now abandoned.

FIELD OF THE INVENTION

The present invention relates to new azoniaspironortropine derivatives and to methods of making same. More particularly, it relates to azoniaspironortropine derivatives having the formula

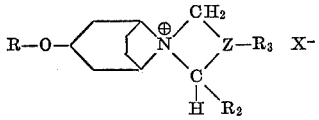

wherein R is selected from the group consisting of hydrogen, or an acid radical of the formula $R_1CO$, wherein $R_1$ is selected from the group consisting of lower alkyl, phenyl, mono- or di-phenylated hydroxymethyl- or hydroxyethyl; wherein $R_2$ is selected from the group consisting of hydrogen and methyl; wherein $R_3$ is methyl and bound to the hetero atom if Z contains nitrogen as a hetero atom; and wherein Z is selected from the group consisting of ethylene, trimethylene, $-CH_2-O-CH_2-$, $-CH_2-N(R_3)-CH_2-$, vinylene and o-phenylene; wherein $X^-$ is an anion, and where the oxygen atom stands in trans or cis position to the bridging nitrogen atom, and to methods of producing said derivatives.

DESCRIPTION

The azoniaspironortropine derivatives of the present invention can be prepared by spirocyclizing a compound having the formula

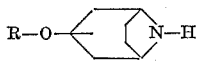

with a dihalide having the formula

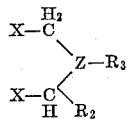

wherein the radicals R, $R_1$, $R_2$, $R_3$ and Z have the meanings set out above, and X is a halogen.

By the reaction of nortropine or suitable derivatives thereof with suitable dihalides there are obtained not only the expected bistertiary bisnortropines but in addition good yields of the above designated azoniaspiranes of the nor-3α- or 3β-tropanols, or esters thereof. These previously unknown derivatives of nortropine have been found to possess, among other interesting properties, excellent spasmolytic properties and in their effectiveness and efficiency in this respect they surpass any of the known tropine derivatives. The spasmolytic activity of these new compounds is shown in Table I below compared to that of atropine and from which it will be seen that the undesirable side effects of atropine are present to a lesser extent, or even completely absent (see Table II below).

TABLE I.—SPASMOLYSIS AT THE ISOLATED SMALL INTESTINES OF THE GUINEA PIG

| | Spasmolysis* (Atropine sulfate=100) |
|---|---|
| Atropine sulfate | 100 |
| Scopolamine bromobutylate | 10 |
| Azoniaspiro [3α-tropoyloxy-nortropane-8,1'-pyrrolidine]-chloride | 110 |
| Azoniaspiro [3α-tropoyloxy-nortropane-8, 1'-piperidine]-chloride | 11 |
| Azoniaspiro [3α-benziloyloxy-nortropane-8, 1'-pyrrolidine]-chloride | 29 |
| Azoniaspiro [3α-benziloyloxy-nortropane-8,1'-piperidine]-chloride | 29 |

*About 50% attenuation of the acetylcholine spasm at the isolated smaller intestines of the guinea pig. (Method of R. Magnus as described in: Pflugers Arch. der ges Physiol des Menschen und der Tiere 102, 123 (1904).)

TABLE II.—MYDRIASIS AT THE EYE OF THE MOUSE

| | Mydriasis* (50 gammas, or 100 gammas, resp. per kg.), percent | |
|---|---|---|
| Atropine sulfate | 221 | 260 |
| Scopolamine bromobutylate | | 123 |
| Azoniaspiro [3α-tropoyloxy-nortropane-8,1'-pyrrolidine]-chloride | 185 | 207 |
| Azoniaspiro [3α-tropoyloxy-nortropane-8,1'-piperidine]-chloride | 110 | 114 |
| Azoniaspiro [3α-benziloyloxy-nortropane-8,1'-pyrrolidine]-chloride | | 245 |
| Azoniaspiro [3α-benziloyloxy-nortropane-8,1'-piperidine]-chloride | 145 | |

*Width of pupil of untreated animal is equated to 100%. (This is the method of P. Pulewka as published in Naunyn-Schmiedebergs Arch. fur exp Pathol und Pharmakol 168, 306 (1932).)

In producing the new compounds of this invention either nortropine, or as ester thereof, prepared by any known method, is cyclized in a polar solvent, preferably a mixture of acetonitrile and methanol, with a suitable dihalide such as, for example, 1,4-dibromobutane, by heating the reaction mixture to 60° C. for several days. Alternately, nortropine can be heated for 6 to 8 hours at 40 to 80° C. in a polar solvent, e.g., aqueous alcohol, with a suitable dihalide in the presence of an alkali hydroxide or a basic ion exchange resin. The azoniaspironortropine halides can then be recrystallized from absolute alcohol, and if desired esterified in a known manner.

Other suitable dihalides including 1,5-dichloropentane, 1,4-dibromopentane, cis - 1,4 - dibromobutene - (2),β,β'-dichloro-diethylmethylamine, as well as still other dihalides, can be similarly reacted to give therapeutically valuable compounds of similar properties.

Similarly, the reaction of azoniaspironortropine halides with acid chlorides is not limited to tropic acid, mandelic acid and benzilic acid, since other esters such as esters of acetic acid, α-propyl-valerianic acid or benzoic acid, can also be prepared.

The isolation of the esterified azoniaspiro compounds is preferably accomplished by adsorbing the reaction product upon an acid ion exchange resin on the basis of polyacrylic compounds containing carboxylate groups, followed by elution with a lower aliphatic acid, such as formic acid, of suitable strength. The residue from the elution can be recrystallized from organic solvents, such as alcohols, after addition of a hydrogen-halide acid, such as hydrogen chloride or hydrogen bromide, or other mineral acid.

The preparation of the new azoniaspiro compounds of the present invention can best be illustrated by the following specific examples. It is to be understood, however, that the invention is not limited either to the specific compounds whose method of production is described, nor to the specific modifications of producing them set forth therein. Other starting compounds coming within the scope of compounds described above may be suitably substituted for the specific compounds used in the examples, and modifications in the procedures known to one skilled in the art may be employed without departing from the concept of the invention which is defined by the appended claims.

EXAMPLE 1

Azoniaspiro [3α-mandeloyloxy-nortropane-8,1'-pyrrolidine]-chloride was prepared as follows: 2.61 grams of norhomatropine (10 mmol) and 1.90 grams of 1,4-dichlorobutane (15 mmol) were heated for two weeks at 60° C., in 50 ml. of a medium composed of acetonitrile and methanol (1:1). After conclusion of the reaction period the solvent was removed by vacuum distillation, dilute ammonia solution added and the resulting mixture extracted several times with ether. The remaining aqueous phase was then evaporated to dryness in vacuo, and the residue then recrystallized from a mixture of methanol and acetone. Melting point: 196–198° C.; yield, about 60% of theory.

EXAMPLE 2

(a) Azoniaspiro [3α-hydroxy-nortropane-8,1' - pyrrolidine]-chloride was produced as follows: 12.7 grams of nortropine (0.1 mol) and 21.6 grams of 1,4-dibromobutane (0.1 mol) were heated, with stirring, for 14 hours at 38–40° C. in 200 ml. of 70% ethanol in the presence of a strongly basic ion exchange resin. The filtrate from this reaction mixture was adjusted to a pH of 4–5 by the addition of dilute hydrochloric acid, evaporated to dryness in vacuo, and the residue crystallized from methanol-ether. Melting point: 294–297° C. Yield: 51% of theory.

(b) Azoniaspiro [3α-mandeloyloxy-nortropane-8,1'-pyrolidine]-chloride was produced as follows: 2.17 grams of azoniaspiro [3α-hydroxy-nortropane-8,1'-pyrrolidine]-chloride (10 mmol) and 4.24 grams of acetylmandelic acid chloride (20 mmol) were heated in vacuo for 6 hours at 100° C. At the end of the reaction 40 ml. of water was added and the resulting mixture repeatedly shaken with ether. The pH of the aqueous phase was then adjusted to 6.7–6.8 and continuously extracted for 24 hours with chloroform. The residue of the chloroform extract was allowed to stand with 20 ml. of concentrated hydrochloric acid for 24 hours. The hydrochloric acid was then removed by vacuum distillation and the residue then filtered adsorptively over alumina in anhydrous alcohol solution. The filtrate residue was then crystallized from methanol-acetone. Melting point: 197–198° C. Yield: about 20% of theory.

EXAMPLE 3

(a) Azoniaspiro [3β-hydroxy-nortropane-8,1'-pyrrolidine]-bromide was prepared as follows: 12.7 grams of pseudonortropine (0.1 mol) and 32.4 grams of 1,4-dibromobutane (0.15 mol) were heated for 8 days at 60° C. in 100 ml. of acetonitrile and methanol (1:1). After removal of the solvent in vacuo and the addition of aqueous ammonia the resulting mixture was extracted several times with ether, and the resulting aqueous phase evaporated to dryness in vacuo, and finally the residue recrystallized from ethanol-ether. Melting point: 313–315° C. with decomposition. Yield: about 45% of theory.

(b) Azoniaspiro [3β-tropoyloxy-nortropane-8,1'-pyrrolidine]-chloride was produced as follows: 2.17 grams of azoniaspiro [3β-hydroxy-nortropane-8,1'-pyrrolidine]-bromide (10 mmol) and 3.39 grams of acetyltropaacid chloride (20 mmol) were heated for 3 hours at 100–110° C. At the conclusion of this time 10 ml. of water was added to the reaction mixture and the resulting mixture extracted repeatedly with ether. The aqueous phase was then treated with an acid ion exchange resin, washed with 3 N formic acid, and after standing with 12 N formic acid for 24 hours the ester of tropaacid was eluted from the ion exchange resin with formic acid of the same strength. The eluate was then dried in vacuo, and the residue, after addition of a slight excess of dilute hydrochloric acid, again dried in vacuo under mild conditions, and finally crystallized from alcohol by the addition of ether. Melting point: 212–215° C. Yield: about 20% theory.

EXAMPLE 4

(a) Azoniaspiro [3α-hydroxy-nortropane-8,4'-morpholine]-chloride was prepared as follows: 12.7 grams of nortropine (0.1 mol) and 28.6 grams of β,β'-dichlorodiethyl ether (0.2 mol) were dissolved in 50 ml. ethanol and after addition of 100 grams of 16% aqueous sodium hydroxide solution (0.4 mol), heated for 2½ hours at 100° C. Both prior to and after neutralization with dilute hydrochloric acid the reaction product was extracted several times with ether. The solvent was then removed from the aqueous solution by evaporation in vacuo, and the residue extracted with hot, anhydrous ethanol. The residue of the alcoholic solution was finally crystallized from isopropanol. Melting point: 280° C. with decomposition. Yield: about 70% of the theory.

(b) Azoniaspiro [3α-hydroxy-nortropane-8,4'-morpholine]-perchlorate was prepared as follows: A solution of 2.33 g. of azoniaspiro [3α-hydroxy-nortropane-8,4'-morpholine]-chloride (10 mmol) in 20 ml. water was treated with an acid ion exchange resin and then eluted until the eluate was free of halogen. It was the further eluted with 12 N formic acid and the solvent separated from the eluate in vacuo. The residue was then weighed and mixed with an equivalent amount of perchloric acid. The solution obtained in vacuo was distilled to dryness and the residue recrystallized from isopropanol. Melting point: 254° C. with decomposition. Yield: about 85% of theory.

A solution of 2.33 g. of azoniaspiro [3α-hydroxy-nortropane-8,4'-morpholine]-chloride (10 mmol) was treated with a strongly basic ion exchange resin and then eluted with water. By the addition of dilute perchloric acid the eluate was adjusted to a pH of 6–7 and separated in vacuo from the solvent. The eluate residue was then recrystallized from isopropanol. Melting point: 254° C. with decomposition. Yield: about 95% of theory.

(c) Azoniaspiro [3α-benzoyloxy-nortropane-8,4'-morpholine]-chloride was prepared as follows: 2.33 g. of azoniaspiro [3α-hydroxy - nortropane-8,4'-morpholine]-chloride (10 mmol) and 2.8 g. of benzoylchloride (20 mmol) were heated to 110° C. for a period of 2 hours. The crystalline product precipitated during the reaction was separated after cooling, repeatedly triturated with ether and recrystallized several times from isopropanol. Melting point: 258° C. with decomposition. Yield: 70% of theory.

EXAMPLE 5

(a) Azoniaspiro [3α-hydroxy-nortropane-8,2'-isoindoline]-bromide was prepared as follows: 1.27 grams nortropine (10 mmol) and 3.94 grams of o-xylylene dibromide (15 mmol) were heated in 25 ml. of acetonitrile-methanol (1:1) for 16 days at 60° C. After removal of the solvent in vacuo and addition of aqueous ammonia the resulting mixture was extracted repeatedly with ether. The resulting aqueous layer was evaporated in vacuo to dryness and the residue crystallized from anhydrous alcohol after addition of ether. Melting point: 254–256° C. wth decomposition. Yield: about 50% of theory.

(b) Azoniaspiro [3α-benziloyloxy-nortropane-8,2'-isoindoline]-chloride was prepared as follows: Azoniaspiro [3α-hydroxy-nortropane - 8,2' - isoindoline]-bromide was initially converted into the basic form by action of a basic ion exchange resin. The eluate was weakly acidified with hydrochloric acid and distilled in vacuo to dryness and the resulting residue crystallized from ethanol by addition of ethyl acetate.

1.33 g. of azoniaspiro [3α-hydroxy-nortropane-8,2'-isoindoline]-chloride (5 mmol) and 2.65 g. of α-chloro-diphenyl acetyl chloride (10 mmol) were heated at 160–165° C. for a period of 6 hours. The cooled melt was dissolved in 10 ml. of methanol. After addition of 50 ml. of water the methanol was removed in vacuo from the solution which was subsequently repeatedly shaken out with ether. The water phase was continuously extracted with ethyl acetate and the resulting ethyl acetate phase was dried with sodium sulfate and the filtrate concentrated until crystallization occurred. The crystallate was recrystallized from ethanol by addition of ether. Melting point: 265–267° C. with decomposition. Yield: about 18% of theory.

EXAMPLE 6

(a) Azoniaspiro [3α-hydroxy-nortropane-8,1'-piperidine]-chloride was prepared as follows: 6.3 g. of nortropine (50 mmol) and 14.1 g. of 1,5-dichloropentane (100 mmol) were heated at 60° C. in 50 ml. of acetonitrile methanol (1:1) for a period of 14 days. Subsequently the solvent was removed by vacuum distillation and 10 ml. of water and ether added to the residue. After repeated shaking out of the aqueous phase with ether the aqueous phase was treated with activated carbon and then concentrated to dryness in vacuo. The residue thus obtained was crystallized from ethanol by the addition of ethyl acetate. Melting point: 274–276° C. with decomposition. Yield: about 45% of theory.

(b) Azoniaspiro [3α-hydroxy-nortropane-8,1'-piperidine]-nitrate was prepared as follows: A solution of 4.62 g. of azoniaspiro [3α-hydroxy-nortropane-8,1'-piperidine]-chloride (20 mmol) in 50 ml. of water was treated with a strongly basic ion exchange resin and then eluted with water. By the addition of dilute nitric acid the eluate was adjusted to a pH of 6–7 and then concentrated to dryness in vacuo. The residue was then crystallized from absolute alcohol by the addition of ether. Melting point: 205–210° C. with decomposition, after sintering. Yield: about 95% of theory.

EXAMPLE 7

Azoniaspiro [3α-tropoyloxy-nortropane - 8,1' - piperidine]-chloride was prepared as follows: 2.75 g. of nortropine (10 mmol) and 2.82 g. of 1,5-dichloropentane (20 mmol) in 40 ml. of acetonitrile were heated to boiling for a period of 3 days. The solvent was then removed by distillation. After addition of dilute ammonia the residue was shaken several times with ether and the remaining water phase was concentrated to dryness in vacuo and the residue was recrystallized from ethanol-ether. Melting point: 216–218° C. with decomposition. Yield: about 40% of theory. Taking into account 1.1 g. of recoverable nortropine, the yield was 62% of theory.

EXAMPLE 8

Azoniaspiro [3α-benziloyloxy-nortropane-8,1'-piperidine]-chloride was produced as follows: 3.4 g. of nortropine benzilate (10 mmol) and 2.83 g. of 1,5-dichloropentane (20 mmol) in 40 ml. of acetonitrile were heated to boiling for 3 days. The precipitated crystalline material was recrystallized from ethanol-ether. Melting point: 244° C. with decomposition. Yield: about 34.6% of theory. Taking into account 1.7 g. of recoverable nortropine benzilate, the yield was about 69.2% of theory.

EXAMPLE 9

Azoniaspiro [3α - benzoyloxy - nortropane - 8,1' - (2'-methyl)-pyrrolidine-bromide was prepared as follows: 9.2 g. of nortropine benzoate (40 mmol) and 4.6 g. of 1,4-dibromopentane (20 mmol) were dissolved in 100 ml. of acetonitrile and heated at 80° C. for a period of 2 days. After removal of the solvent by distillation in vacuo the residue was mixed with strongly diluted ammonia and ether. After separating the phases the water phase was shaken several times with ether, acidified with dilute hydrobromic acid and after treatment with activated carbon concentrated to dryness in vacuo. The residue was dissolved in absolute alcohol and fractionally crystallized by addition of ether. Melting point 234–237° C. with decomposition. Yield: about 80% of theory.

EXAMPLE 10

(a) Azoniaspiro [3α - hydroxy - nortropane - 8,1'-(4'-methyl)-piperazine]-chloride-hydrochloride was prepared as follows: 3.3 g. of bis-(β-chlorethyl)-methylamine (21 mmol) were added to a solution of 2.54 g. of nortropine (20 mmol) in 60 ml. of water and after addition of a strongly basic ion exchange resin the resulting mixture was stirred vigorously for a period of 3–4 hours. Subsequently, the filtrate was shaken with ether, then weakly acidified with hydrochloric acid and concentrated to dryness in vacuo. The residue was then fractionally crystallized from absolute alcohol. Melting point: 270° C. with decomposition. Yield: about 75% of theory.

(b) Azoniaspiro [3α - acetoxy - nortropane - 8,1'-(4'-methyl)-piperazine]-chloride-hydrochloride was produced as follows: 2.8 g. of azoniaspiro [3α-hydroxy-nortropane-8,1'-(4'-methyl)-piperazine]-chloride - hydrochloride (10 mmol) were refluxed in 50 ml. of acetyl chloride for a period of 3 hours. After the greater part of the excess acetyl chloride was distilled off 100 ml. of ether were added. The precipitated product was dissolved in water and the resulting solution repeatedly shaken with ether. The aqueous phase was concentrated to dryness in vacuo and the residue crystallized from absolute alcohol by addition of ether. Melting point: 239–241° C. with decomposition. Yield: about 95% of theory.

EXAMPLE 11

Azoniaspiro [3α-tropoyloxy-nortropane - 8,1' - pyrrolidine]-chloride was produced as follows: 2.75 g. of nortropine (10 mmol) and 2.54 g. of 1,4-dichlorobutane (20 mmol) in 40 ml. of acetonitrile were heated to boiling for a period of 3 days. The solvent was then driven off by distillation and after addition of dilute ammonia the residue was shaken several times with ether and the resulting water phase concentrated to dryness in vacuo. The resulting residue was recrystallized from ethanol-ether. Melting point: 205–207° C. Yield: about 35% of theory.

EXAMPLE 12

Azoniaspiro[3α - benziloyloxy-nortropane - 8,1' - pyrrolidine]-chloride was prepared as follows: 3.4 g. of nortropine benzilate (10 mmol) and 2.54 g. of 1,4-dichlorobutane (20 mmol) in 40 ml. of acetonitrile were heated to boiling for a period of 3 days. The precipitated crystalline produce was recrystallized from ethanol-ether. Melting point: 255–257° C. with decomposition. Yield: about 46% of theory. Taking into account 1.2 g. of recoverable nortropine benzilate, yield about 71% of theory.

EXAMPLE 13

Azoniaspiro[3α - (α' - propyl) - valeroyloxy - nortropane-8,1'-pyrrolidine]-chloride was produced as follows: 4.4 g. of azoniaspiro[3α-hydroxy-nortropane-8,1'-pyrrolidine]-chloride (20 mmol) and 10.0 of α-propyl-valeryl chloride (30 mmol) were heated at 110–130° C. for a period of 3 hours. The reaction product was dissolved in chloroform, the resulting solution filtered and the solvent removed from the filtrate by heating in vacuo. The resulting residue was repeatedly recrystallized from acetone by addition of ether. Melting point: 296–298° C. Yield: about 90% of theory.

EXAMPLE 14

Azoniaspiro[3α - hydroxy - nortropane - 8,1' - pyrroline-Δ]-bromide was produced as follows: 6.36 g. of nortropine (50 mmol) and 10.7 g. of 1,4-dibromobutene-(2) (50 mmol) (about 70% in the cis form) in 50 ml. of acetonitrile-methanol (1:1) were heated at 60° C. for a period of 8 days. The precipitated crystalline reaction product was filtered, the filtrate concentrated to dryness in vacuo, the residue dissolved in 20 ml. of water and the resulting solution shaken repeatedly with ether. The aqueous phase was treated with activated carbon and again concentrated to dryness in vacuo. The residue was then dissolved in 15 ml. isopropanol-acetone (1:1) and the resulting solution subjected to fractional chromatography on alumina using the same solvent. After a 300 ml. first running, 600 ml. of eluate were taken off from which the solvent was removed in vacuo. The residue was crystallized from isopropanol by addition of ether. Melting point: 241-243° C. with decomposition. Yield: about 27% of theory, taking into account recoverable nortropine.

EXAMPLE 15

Azoniaspiro[3α - mandeloyloxy - nortropane - 8,4'-morpholine]-chloride was prepared as follows: The greater part of 2.61 g. of nortropine mandelate (10 mmol) was dissolved with heating in 10 ml. of acetonitrile and the resulting solution heated at 60° C. for a period of 2 days after addition of 1.43 g. of β,β'-dichlorodiethyl ether (10 mmol). The precipitated crystalline product was recrystallized from acetonitrile. Melting point: 232° C. with decomposition. Yield: about 38% of theory.

EXAMPLE 16

Azoniaspiro[3α - benziloyloxy - nortropane - 8,4'-morpholine]-chloride was produced as follows: The greater part of 3.4 g. of nortropine benzilate (10 mmol) was dissolved with heating in 10 ml. of acetonitrile. After addition of 1.43 g. of β,β'-dichlorodiethyl ether (10 mmol) the resulting solution was heated at 80° C. for a period of 4 days. The precipitated crystalline product was recrystallized from acetonitrile. Melting point: 240° C. with decomposition. Yield: about 47% of theory.

What is claimed is:

1. A compound of the formula

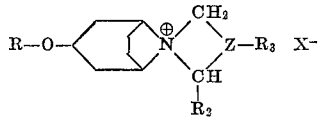

wherein R is selected from the group consisting of hydrogen or an acid radical of the formula $R_1CO$, wherein $R_1$ is selected from the group consisting of lower alkyl, phenyl, mono- or di-phenylated hydroxymethyl- or hydroxyethyl-; wherein $R_2$ is selected from the group consisting of hydrogen and methyl; wherein $R_3$ is methyl and bound to the hetero atom if Z contains nitrogen as a hetero atom; and wherein Z is selected from the group consisting of ethylene, trimethylene, —$CH_2$—O—$CH_2$—,

—$CH_2$—N($R_3$)—$CH_2$— vinylene and o-phenylene; wherein $X^-$ is an anion, and where the oxygen atom stands in trans or cis position to the bridging nitrogen atom.

2. An azoniaspironortropine derivative selected from the group consisting of:

Azoniaspiro[3α-mandeloyloxy-nortropane-8,1'-pyrrolidine]-chloride
Azoniaspiro[3α-hydroxy-nortropane-8,1'-pyrrolidine]-chloride
Azoniaspiro[3β-hydroxy-nortropane-8,1'-pyrrolidine]-bromide
Azoniaspiro[3β-tropoyloxy-nortropane-8,1'-pyrrolidine]-chloride
Azoniaspiro[3α-hydroxy-nortropane-8,4'-morpholine]-chloride
Azoniaspiro[3α-hydroxy-nortropane-8,4'-morpholine]-perchlorate
Azoniaspiro[3α-benzoyloxy-nortropane-8,4'-morpholine]-chloride
Azoniaspiro[3α-hydroxy-nortropane-8,2'-isoindoline]-bromide
Azoniaspiro[3α-benziloyloxy-nortropane-8,2'-isoindoline]-chloride
Azoniaspiro[3α-hydroxy-nortropane-8,1'-piperidine]-chloride
Azoniaspiro[3α-hydroxy-nortropane-8,1'-piperidine]-nitrate
Azoniaspiro[3α-tropoyloxy-nortropane-8,1'-piperidine]-chloride
Azoniaspiro[3α-benziloyloxy-nortropane-8,1'-piperidine]-chloride
Azoniaspiro[3α-benzoyloxy-nortropane-8,1'-(2'-methyl)-pyrrolidine]-bromide
Azoniaspiro[3α-hydroxy-nortropane-8,1'-(4'-methyl)-piperazine]-chloride-hydrochloride
Azoniaspiro[3α-tropoyloxy-nortropane-8,1'-pyrrolidine]-chloride
Azoniaspiro[3α-acetoxy-nortropane-8,1'-(4'-methyl)-piperazine]-chloride-hydrochloride
Azoniaspiro[3α-benziloyloxy-nortropane-8,1'-pyrrolidine]-chloride
Azoniaspiro[3α-(α'-propyl)-valeroyloxy-nortropane-8,1'-pyrrolidine]chloride
Azoniaspiro[3α-hydroxy-nortropane-8,1'-pyrroline-Δ³]-bromide
Azoniaspiro[3α-mandeloyloxy-nortropane-8,4'-morpholine]-chloride
Azoniaspiro[3α-benziloyloxy-nortropane-8,4'-morpholine]-chloride.

References Cited

Braun et al., Chem. Berichte, vol. 51 (1), pp. 255–265 (1918).

Noller, Chemistry of Organic Compounds, second edition, Saunders, pp. 166–169, 1957.

HENRY R. JILES, Primary Examiner

A. L. ROTMAN, Assistant Examiner

U.S. Cl. X.R.

260—247.7, 268, 292; 424—248, 250, 265